No. 716,769. Patented Dec. 23, 1902.
J. W. SEAVER.
ORE STORAGE AND DELIVERY BIN.
(Application filed Mar. 19, 1901.)
(No Model.)
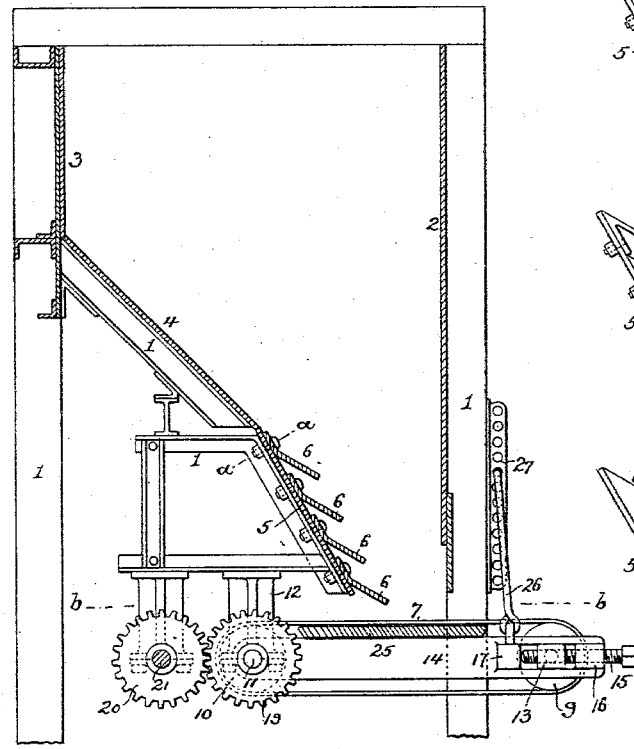
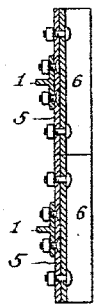
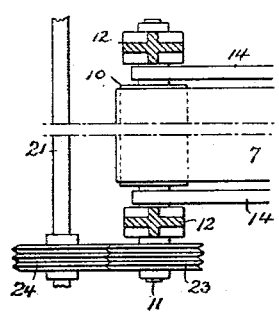
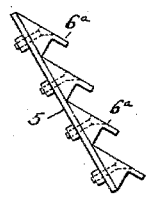
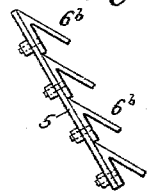
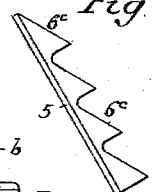
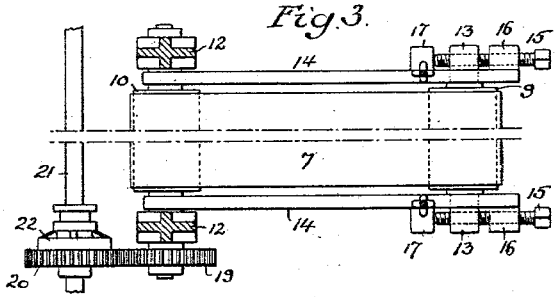
Witnesses:—
Inventor:—
John W. Seaver,
by his Attorneys:—

UNITED STATES PATENT OFFICE.

JOHN W. SEAVER, OF CLEVELAND, OHIO, ASSIGNOR TO THE WELLMAN SEAVER ENGINEERING COMPANY, OF CLEVELAND, OHIO, A CORPORATION OF OHIO.

ORE STORAGE AND DELIVERY BIN.

SPECIFICATION forming part of Letters Patent No. 716,769, dated December 23, 1902

Application filed March 19, 1901. Serial No. 51,915. (No model.)

*To all whom it may concern:*

Be it known that I, JOHN W. SEAVER, a citizen of the United States, and a resident of Cleveland, Ohio, have invented certain Improvements in Ore Storage and Delivery Bins, of which the following is a specification.

The object of my invention is to so construct a bin for the storage and delivery of ore, coke, coal, or other granular material as to prevent choking of the delivery portion of the bin and to provide a positive and easily-regulated delivery mechanism which can be rendered operative or inoperative with facility. This object I attain in the manner hereinafter set forth, reference being had to the accompanying drawing, in which—

Figure 1 is a transverse section of a storage and delivery bin for granular material constructed in accordance with my invention. Fig. 2 is a sectional plan on the line $a\ a$, Fig. 1. Fig. 3 is a sectional plan view on the line $b\ b$, Fig. 1. Figs. 4, 5, and 6 are views illustrating various methods of constructing the delivery portion of the bin in accordance with my invention; and Fig. 7 is a view similar to part of Fig. 3, illustrating a modification of part of the invention.

In Fig. 1 of the drawings, 1 represents a substantial framework carrying lining or casing plates 2, 3, 4, and 5, which constitute the bin-inclosure and which may be employed in connection with any desired number of transverse division-plates, so as to separate the bin into any desired number of independent compartments, each with its own delivery mechanism.

The bin has an inclined bottom 4 5, so that the ore or other granular material will feed down through the same by gravity, the angle of the portion 5 of the bin being more acute in respect to a vertical line than that of the portion 4 above the same, so that, on the one hand, the capacity of the bin is not restricted as it would be if the bottom of the bin was throughout of the same angle as the portion 5, while, on the other hand, the delivery portion of the throat of the bin is not contracted so rapidly as it would be if the angle of the portion 4 of the bin was continued down to the bottom of the same.

With the present construction of ore storage and delivery bins much difficulty is experienced because of the choking or jamming of the mass of ore in the lower portion of the bin adjacent to the delivery-mouth, and I find that this defect can be effectually overcome by imparting a step-like form to either the front or rear portions or to both of these portions of the lower or delivery end of the bin, so that the mass of ore can after passing each step expand into a larger space, these successive loosenings of the mass preventing the jamming or clogging of the same in the contracted throat of the bin and insuring free delivery from the mouth of the same.

I prefer to form the step-like throat portion of the bin by attaching inclined plates 6 to the rear portion 5 of the bin, these plates projecting outwardly at an angle from said portion 5 of the casing, so that while their inner ends follow the general angle of said portion 5 they permit periodical loosening up of the mass of granular material after it has passed the lower edge of each plate.

Figs. 4 and 5 show plates $6^a$ and $6^b$ of somewhat different form from the plates 6 shown in Fig. 1, but capable of attaining the same result, and Fig. 6 shows a series of projections $6^c$, cast or otherwise formed integral with the plate 5.

For convenience of access to the lower or delivery portion of the bin I prefer to make the lower casing 5 in the form of comparatively short plates bolted or otherwise secured to the fixed bin 1—as shown, for instance, in Fig. 2—each of these plates carrying its respective sections of the plates 6 $6^a$, &c., so that any section can be readily removed when it is desired to gain access to a particular portion of the bin or when repair or replacement of such section becomes necessary.

For delivering ore or other granular material from the bin I prefer to use in connection with each delivery-mouth of the bin an endless belt, onto which the granular material is delivered and by which it is continually conveyed away from the mouth of the bin. This belt 7 may be composed of any material capable of resisting the wear to which it is subjected, the belt being mounted upon front and rear drums 9 and 10, carried by shafts, one of which is, by preference, adjustable in respect to the other, so as to maintain the belt under proper tension. In the present instance the shaft 11 of the rear drum 10 is mounted in bearings in hangers 12, depending from the fixed frame of the bin, and the shaft of the front drum 9 is mounted in boxes 13, guided in slots at the front ends of arms 14, which are hung to the shaft 11 of the rear drum, the boxes 13 being under control of adjusting-screws 15, which are adapted to threaded openings in the boxes 13, pass through guide-lugs 16 on the arms 14, and bear against lugs 17, projecting from said arms, as shown in Figs. 1 and 3. The shaft 11 has a spur-wheel 19 meshing with a similar spur-wheel 20 on a shaft 21, which preferably extends throughout the entire length of the bin and is geared to the drum-shaft of each delivery-belt 7 when a series of the latter are employed, each of the spur-wheels 20 being capable of being clutched to or released from the shaft 21 by any suitable form of friction or other clutching device 22 on the shaft 21, so that the movement of the belt 7 can be arrested without stopping the rotation of the shaft 21. If the shaft 11 is continuous throughout the length of the bin, the stoppage of any one of a series of belts driven by said shaft can with equal facility be effected by using the friction-clutch mechanism 22 in connection with each of the belt-drums 10 on said shaft 11, or instead of this construction the hangers 12 may be pivotally mounted on the frame of the bin, so that the framework carrying the delivery-belt mechanism is capable of longitudinal movement from and toward the shaft 21, in which case friction-drums on said shaft 21 and on the shaft 11 may take the place of the spur-wheels and friction-clutch shown in Fig. 3, such friction-drums being represented, respectively, at 23 and 24 in Fig. 7.

The frames 14 carry a transverse platform 25, extending from frame to frame beneath the upper run of the delivery-belt 7, so as to maintain said upper run in its proper horizontal course and relieve it from strains to which it might be subjected in the absence of any such support.

The rate of delivery of the granular material from the bin can be governed independently of the speed of the delivery-belt by raising or lowering the outer portion of said belt, and thus varying the effective area of the delivery-mouth of the bin.

Various means may be adopted for thus vertically adjusting the outer or swinging end of the belt-carrying framework, the means shown in the present instance comprising hooked rods 26, hung to the eyes on the side bars 14 and each adapted to engage with any one of a series of openings in a perforated plate 27, secured to the framework of the bin, as shown in Fig. 1.

Having thus described my invention, I claim and desire to secure by Letters Patent—

1. A bin for the storage and delivery of ore or other like material, said bin having a delivery-throat, one wall of which presents a step-like formation in a plane inclined in respect to the opposite wall, the steps being separated from each other vertically by fixed spaces into which the descending mass of ore can expand, substantially as specified.

2. A bin for the storage and delivery of ore or other granular material, said bin having a wall of its delivery-throat composed of a series of independently-removable sections each of less width than the lateral dimensions of the bin and having a step-like formation on its inner face produced by means of plates secured to said section, said plates being inclined in respect to the wall to which they are attached and being vertically separated from each other by spaces into which the descending mass of ore can expand, substantially as described.

3. The combination of a bin for the storage and delivery of ore or other granular material, an endless belt so disposed in respect to the mouth of the bin as to receive and convey the granular material therefrom, a driving-drum for said belt having a shaft adapted to fixed bearings, a frame mounted on said shaft and carrying the bearings for the shaft of the other belt-drum and also carrying a platform for supporting the upper run of the belt, and means for adjusting the free end of said frame toward and from the edge of the delivery-mouth of the bin so as to vary the area of said mouth, and means for securing said frame in position after adjustment, substantially as specified.

In testimony whereof I have signed my name to this specification in the presence of two subscribing witnesses.

JOHN W. SEAVER.

Witnesses:
 HERBERT P. GLIDDEN,
 C. W. COMSTOCK.